United States Patent
Zappi et al.

(10) Patent No.: US 6,328,875 B1
(45) Date of Patent: *Dec. 11, 2001

(54) ELECTROLYTIC APPARATUS, METHODS FOR PURIFICATION OF AQUEOUS SOLUTIONS AND SYNTHESIS OF CHEMICALS

(75) Inventors: Guillermo Daniel Zappi, Williamsville; Norman L. Weinberg, East Amherst, both of NY (US)

(73) Assignee: Zappi Water Purification System, Inc.,, Lancaster, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 09/433,686

(22) Filed: Nov. 4, 1999

Related U.S. Application Data (63) Continuation-in-part of application No. 09/206,924, filed on Dec. 7, 1998.

(51) Int. Cl.$^7$ .................................................. C02F 1/461
(52) U.S. Cl. .................... 205/500; 205/701; 205/742; 205/746; 205/758; 204/275.1
(58) Field of Search ........................ 205/500, 701, 205/742, 746, 758; 204/275.1

(56) References Cited

U.S. PATENT DOCUMENTS

| | | | |
|---|---|---|---|
| Re. 37,055 | 2/2001 | Silveri | 205/687 |
| 3,793,173 | 2/1974 | Kawahata et al. | 204/149 |
| 3,859,195 | * 1/1975 | Williams | 204/272 |
| 3,919,062 | 11/1975 | Lundquist, Jr. et al. | 204/149 |
| 3,923,629 | 12/1975 | Shaffer | 204/260 |
| 3,926,771 | 12/1975 | Lieb et al. | 204/268 |
| 4,040,938 | 8/1977 | Robertson | 204/283 |
| 4,048,047 | 9/1977 | Beck et al. | 204/270 |
| 4,061,556 | 12/1977 | Reis et al. | 204/271 |
| 4,062,754 | 12/1977 | Eibl | 204/268 |
| 4,085,028 | 4/1978 | McCallum | 204/269 |
| 4,100,052 | 7/1978 | Stillman | 204/268 |
| 4,179,347 | 12/1979 | Krause et al. | 204/149 |
| 4,326,941 | 4/1982 | Westerlund | 204/268 |
| 4,406,768 | 9/1983 | King | 204/268 |
| 4,445,990 | 5/1984 | Kim et al. | 204/151 |
| 4,500,403 | 2/1985 | King | 204/255 |

(List continued on next page.)

OTHER PUBLICATIONS

Brinecell, Inc., 1 page, Jan. 1992.
Wenisch, Franz et al., *Experiences With An Undivided Cell*, The American Institute of Chemical Engineers, No. 185, vol. 75, pp 14–18 (1979).
Beck, F. et al., *Development of New Cells for Electro–Organic Synthesis*, Chem. Ing. Tech. 41, #17, 943–950 (1969) (English Translation).
Robertson, P. et al., *A New Cell For Electrochemical Processes*, J. Electroanal. Chem., 65, 883–900 (1975).

*Primary Examiner*—Arun S. Phasge
(74) *Attorney, Agent, or Firm*—Howard M. Ellis (57) ABSTRACT

Electropurification of contaminated aqueous media, such as ground water and wastewater from industrial manufacturing facilities like paper mills, food processing plants and textile mills, is readily purified, decolorized and sterilized by improved, more economic open configuration electrolysis cell designs with electrodes comprising a plurality of conductive porous elements in electrical contact with one another. The cells may be divided or undivided, and connected in monopolar or bipolar configuration. When coupled with very narrow capillary gap electrodes more economic operation, particularly when treating solutions of relatively low conductivity is assured. The novel cell design is also useful in the electrosynthesis of chemicals, both organic and inorganic types, such as hypochlorite bleaches and other oxygenated species.

42 Claims, 6 Drawing Sheets

U.S. PATENT DOCUMENTS

| | | | |
|---|---|---|---|
| 4,676,878 | 6/1987 | Chez | 204/101 |
| 4,728,409 | 3/1988 | Oloman | 204/256 |
| 4,790,923 | 12/1988 | Stillman | 204/268 |
| 4,839,007 | 6/1989 | Kotz et al. | 204/149 |
| 4,917,782 | 4/1990 | Davies | 204/152 |
| 4,929,359 | 5/1990 | Tiernan | 210/663 |
| 4,931,166 | 6/1990 | Ramshaw | 204/212 |
| 4,952,298 * | 8/1990 | Bouche-Pillon et al. | 204/228 |
| 4,992,156 | 2/1991 | Silveri | 204/228 |
| 5,085,753 * | 2/1992 | Sherman | 20/267 |
| 5,256,268 | 10/1993 | Goto et al. | 204/268 |
| 5,292,405 | 3/1994 | Wicks | 204/1.11 |
| 5,364,509 | 11/1994 | Dietrich | 204/149 |
| 5,395,492 | 3/1995 | Schoeberl | 204/149 |
| 5,439,576 | 8/1995 | Schoeberl | 204/263 |
| 5,549,812 | 8/1996 | Witte | 205/744 |
| 5,580,438 | 12/1996 | Silveri | 205/687 |
| 5,587,057 | 12/1996 | Metzler et al. | 204/228 |
| 5,647,969 | 7/1997 | Mao | 205/743 |
| 5,688,387 | 11/1997 | Fongen | 204/263 |
| 5,728,287 | 3/1998 | Hough et al. | 205/743 |
| 5,746,904 | 5/1998 | Lee | 205/757 |
| 5,935,412 | 8/1999 | Brainard | 205/687 |
| 5,954,937 | 9/1999 | Farmer | 205/687 |

* cited by examiner

ELECTROLYTIC APPARATUS, METHODS FOR PURIFICATION OF AQUEOUS SOLUTIONS AND SYNTHESIS OF CHEMICALS

CROSS REFERENCE TO RELATED APPLICATION

This application is a continuation-in-part of copending application Ser. No. 09/206,924, filed Dec. 7, 1998 pending.

FIELD OF THE INVENTION

The present invention relates generally to the purification of aqueous solutions and preparation of useful chemical products, and more specifically, to electrochemical methods and more efficient, economic and safer electrolytic apparatus for both the electropurification of drinking water, industrial waste waters and contaminated ground water, as well as the electrochemical synthesis (electrosynthesis) of useful products, e.g., organic and inorganic chemicals.

BACKGROUND OF THE INVENTION

Wastewater can be a valuable resource in cities and towns where population is growing and water supplies are limited. In addition to easing the strain on limited fresh water supplies, the reuse of wastewater can improve the quality of streams and lakes by reducing the effluent discharges they receive. Wastewater may be reclaimed and reused for crop and landscape irrigation, groundwater recharge, or recreational purposes.

The provision of water suitable for drinking is another essential of life. The quality of naturally available water varies from location-to-location, and frequently it is necessary to remove microorganisms, such as bacteria, fungi, spores and other organisms like crypto sporidium; salts, heavy metal ions, organics and combinations of such contaminants.

Over the past several years, numerous primary, secondary and tertiary processes have been employed for the decontamination of industrial wastewater, the purification of ground water and treatment of municipal water supplies rendering them safer for drinking. They include principally combinations of mechanical and biological processes, like comminution, sedimentation, sludge digestion, activated sludge filtration, biological oxidation, nitrification, and so on. Physical and chemical processes have also been widely used, such as flocculation and coagulation with chemical additives, precipitation, filtration, treatment with chlorine, ozone, Fenton's reagent, reverse osmosis, UV sterilization, to name but a few.

Numerous electrochemical technologies have also been proposed for the decontamination of industrial wastewater and ground water, including treatment of municipal water supplies for consumption. While growing in popularity, the role of electrochemistry in water and effluent treatment heretofore has been relatively small compared to some of the mechanical, biological and chemical processes previously mentioned. In some instances, alternative technologies were found to be more economic in terms of initial capital costs, and in the consumption of energy. Too often, earlier electrochemical methods were not cost competitive, both in initial capital costs and operating costs with more traditional methods like chlorination, ozonation, coagulation, and the like.

Earlier electrochemical processes required the introduction of supporting electrolytes as conductivity modifiers which adds to operating costs, and can create further problems with the disposal of by-products. Electrochemical processes in some instances have been ineffective in treating solutions by reducing concentrations of contaminants to levels permitted under government regulations. Heretofore, such electrochemical processes have often lacked sufficient reliability for consistently achieving substantially complete mineralization of organic contaminants, as well as the ability to remove sufficient color from industrial waste waters in compliance with government regulations.

Notwithstanding the foregoing shortcomings associated with earlier electrochemical technologies, electrochemistry is still viewed quite favorably as a primary technology in the decontamination of aqueous solutions. Accordingly, there is a need for more efficient and safer electrochemical cell configurations and processes for more economic treatment of large volumes of industrial waste waters, effluent streams and contaminated ground water, including the decontamination of municipal water supplies making them suitable for drinking. Such electrochemical cell configurations should also be useful in the electrosynthesis of chemical products.

SUMMARY OF THE INVENTION

The present invention relates to improved means for electropurification of aqueous solutions, particularly effluent streams comprising waste waters polluted with a broad spectrum of chemical and biological contaminants, including members from such representative groups as organic and certain inorganic chemical compounds. Representative susceptible inorganic pollutants include ammonia, hydrazine, sulfides, sulfites, nitrites, nitrates, phosphates, metal ions, and so on. Included as organic contaminants are organometallic compounds; dyes from textile mills; carbohydrates, fats and proteinaceous substances from food processing plants; effluent streams, such as black liquor from pulp and paper mills containing lignins and other color bodies; general types of water pollutants, including pathogenic microorganisms, i.e., bacteria, fungi, molds, spores, cysts, protozoa and other infectious agents like viruses; oxygen-demanding wastes, and so on.

While it is impractical to specifically identify by name all possible contaminants which may be treated successfully according to the claimed methods, it will be understood that language appearing in the claims, namely "contaminated aqueous electrolyte solution", or variations thereof is intended to encompass all susceptible pollutants whether organic, inorganic, metal ions or biological.

The electropurification methods and apparatus for practicing this invention are particularly noteworthy in their ability to effectively purify virtually any aqueous solution comprising one or more organic, certain inorganic, including hazardous metal ions and biological contaminants present in concentrations ranging from as low as <1 ppm to as high as >300,000 ppm.

Only electricity is required to achieve the desired chemical change in the composition of the contaminant(s), in most cases. The conductivity of tap water is sufficient for operation of the improved cell design. Hence, it is neither required, nor necessarily desirable to incorporate additives into the contaminated aqueous solutions to modify the conductivity of the solution being treated to achieve the desired decomposition of the pollutant/contaminant. Advantageously, in most instances solid by-products are not produced in the electropurification reactions as to create costly disposal problems. The improved electrochemical processes of the invention are able to achieve complete or virtually complete color removal; complete mineralization of organic contaminants and total destruction of biological pollutants even in the presence of mixed contaminants, and at a cost which is competitive with traditional non-electrochemical methods, such as chlorination, ozonation and coagulation, and thereby meet or exceed government regulations.

Accordingly, it is a principal object of the invention to provide an electrolysis cell which comprises at least one anode and at least one cathode as electrodes positioned in an electrolyzer zone. The electrodes are preferably spaced sufficiently close not only to provide an interelectrode gap capable of minimizing cell voltage and IR loss, but also to achieve conductivity without the need for extra supporting electrolytes or current carriers. Means are provided for directly feeding electrolyte solutions to the electrodes for distribution through the interelectrode gap(s). Means are provided for regulating the residency time of the electrolyte solution in the electrolyzer zone. When the electrolysis cell is employed in electropurification the electrolyte would remain in the electrolyzer zone for a sufficient time interval for modification of contaminants to occur, ether electrochemically by direct means and/or by chemical modification of contaminants to less hazardous substances during residency in the cell. Additional means are provided for collecting treated electrolyte solution descending from the electrolyzer zone. It is also significant, the electrolysis cell according to the invention has an "open configuration".

In addition to the electrochemical cell of this invention, further means are provided for practical and efficient operation, directly feeding contaminated aqueous electrolyte solution to the cell by pump means or by gravity; pretreatment means for the contaminated aqueous electrolyte solutions, for example, means for aeration, pH adjustment, heating, filtering of larger particulates; as well as means for post-treatment, for example, pH adjustment and cooling, or chlorination to provide residual kill for drinking water applications. In addition, the invention contemplates in-line monitoring with sensors and microprocessors for automatic computer-assisted process control, such as pH sensors, UV and visible light, sensors for biological contaminants, temperature, etc.

It is still a further object of the invention to provide a system for purification of aqueous solutions, which comprises:

(i) an electrolysis cell comprising at least one anode and at least one cathode as electrodes positioned in an electrolyzer zone. The electrodes are spaced sufficiently close to one another to provide an interelectrode gap capable of minimizing cell voltage and IR loss. Also included is a conduit means for directly feeding a contaminated aqueous electrolyte solution to the electrodes in the electrolyzer zone. The electrolysis cell is characterized by an open configuration.

(ii) A control valve means for regulating the flow of contaminated aqueous electrolyte solution to the electrodes directly via the conduit means of (i) above.

(iii) Means are included for pumping contaminated aqueous electrolyte solution through the conduit means, and then (iv) rectifier means are included for providing a DC power supply to the electrolysis cell.

The purification system may also include sensor means and computerized means for receiving input from the sensor means and providing output for controlling at least one operating condition of the system selected from the group consisting of current density, flow rate of contaminated aqueous solution to the electrolysis cell, temperature and pH of the contaminated aqueous electrolyte solution. Optional components include exhaust means for further handling of electrochemically produced gaseous by-products; means for pretreatment of the contaminated aqueous electrolyte solution selected from the group consisting of filtration, pH adjustment and temperature adjustment.

As previously discussed, the electrochemical cells of this invention are especially novel in their "open configuration." As appearing in the specification and claims, the expression open "configuration" or variations thereof are defined as electrochemical cell designs adapted for controlled leakage or discharge of treated and decontaminated aqueous electrolyte solution and gaseous or volatile by-products. The above definition is also intended to mean the elimination or exclusion of conventional closed electrochemical cells and tank type cell designs utilizing conventional indirect means for feeding electrolyte to electrodes. Closed flow type electrochemical cells, for example, are often fabricated from a plurality of machined and injection molded cell frames which are typically joined together under pressure into a non-leaking sealed stack with gaskets and O-rings to avoid any leakage of electrolyte from the cell. This type of sealed electrochemical cell is typically found in closed plate and frame type cells. Very close fitting tolerances for cell components are required in order to seal the cell and avoid leakage of electrolyte and gases to the atmosphere. Consequently, initial capital costs of such electrochemical cells, refurbishment costs, including replacement costs for damaged cell frames and gasketing from disassembly of closed plate and frame type cells are high.

Because the configuration of the electrochemical cells of this invention is "open", and not sealed, allowing for controlled leakage of aqueous electrolyte solution and gaseous by-products, sealed cell designs, including gaskets, O-rings and other sealing devices are eliminated. Instead, cell component parts are retained together in close proximity by various mechanical means when needed, including, for instance, clamps, bolts, ties, straps, or fittings which interact by snapping together, and so on. As a result, with the novel open cell concept of this invention initial cell costs, renewal and maintenance costs are minimized.

In the open configuration cells of this invention, electrolyte is fed directly to the electrodes in the electrolyzer zone from a feeder which may be positioned centrally relative to the face of the electrodes, for example, where the contaminated solution engages with the electrodes by flowing through very narrow interelectrode gaps or spaces between the electrodes. During this period the contaminants in the aqueous solution are either directly converted at the electrodes to less hazardous substances and/or through the autogenous generation of chemical oxidants or reductants, such as chlorine, bleach, i.e., hypochlorite; hydrogen, oxygen, or reactive oxygen species, like ozone, peroxide, e.g., hydrogen peroxide, hydroxy radicals, and so on, chemically modified to substances of lesser toxicity, like carbon dioxide, sulfate, hydrogen, oxygen and nitrogen. In some instances, depending on the compositional make-up of pollutants in the solution being treated, it may be desirable to add certain salts like sodium chloride, iron salts or other catalytic salts at low concentration to the solution before or during treatment in the cell. For example, this could be used to generate some active chlorine to provide a residual level of sterilant in the treated water, or to produce ferrous iron to promote the formation of Fenton's reagent with added or electrogenerated hydrogen peroxide. Likewise, oxygen or air may be introduced into the feed stream to enhance peroxide generation.

Because electrolyte is fed directly to the electrode stack usually under positive pressure, gases such as hydrogen and oxygen generated during electrolysis are less prone to accumulate over electrode surfaces by forming insulative blankets or pockets of bubbles. Gas blinding of electrodes produces greater internal resistance to the flow of electricity resulting in higher cell voltages and greater power consumption. However, with direct flow of electrolyte to the cell, the dynamic flow of solution in interelectrode gaps, according to this invention, minimizes gas blanketing, and therefore, minimizes cell voltages.

The aqueous solution entering the cell by means of pumping or gravity feed, cascades over and through available interelectrode gaps, and on exiting the electrolyzer zone of the cell through gravitational forces, descends downwardly into a reservoir, for post treatment, for example, or discharged, such as into a natural waterway. Any undissolved gases generated by electrolysis, in contrast, are vented upwardly from the cell to the atmosphere or may be drawn into a fume collector or hood, if necessary, for collection or further processing.

While the direct feed "open configuration" electrochemical cells, as described herein, preferably provide for the elimination of conventional cell housings or tanks, as will be described in greater detail below, the expression "open configuration" as appearing in the specification and claims, in addition to the foregoing definition, is also intended to include electrochemical cell designs wherein the directly fed electrodes are disposed in the interior region of an open tank or open cell housing. A representative example of an open tank electrochemical cell is that disclosed by U.S. Pat. No. 4,179,347 (Krause et al) used in a continuous system for disinfecting wastewater streams. The cell tank has an open top, a bottom wall, sidewalls and spaced electrodes positioned in the tank interior. Instead of feeding the contaminated aqueous solution directly to the electrodes positioned in the tank the electrolyte, according to Krause et al, is initially fed to a first end of the tank where interior baffles generate currents in the wastewater causing it to circulate upwardly and downwardly through and between the parallel electrodes. Hence, instead of delivering electrolyte directly to the electrode stack where under pressure it is forced through interelectrode gaps between adjacent anodes and cathodes according to the present invention, the electrolyte in the open tank cell of Krause et al indirectly engages with the electrodes through a flooding effect by virtue of the positioning of the electrodes in the lower region of the tank where the aqueous solution resides. This passive, flooding effect is insufficient to achieve the mass transport conditions necessary for efficient destruction particularly of contaminants when present in low concentrations. Consequently, gaseous by-products of the electrolysis reaction can and often do result in the development of a blanket of gas bubbles on electrode surfaces. This generates elevated cell voltages and greater power consumption due to higher internal resistances.

Accordingly, for purposes of this invention the expression "open configuration" as appearing in the specification and claims is also intended to include open tank type electrochemical cells wherein the electrode stack is positioned in the interior of an open tank/housing and includes means for directly feeding contaminated aqueous solutions to the electrodes. With direct feeding the housing does not serve as a reservoir for the contaminated aqueous solution which otherwise would passively engage the electrodes indirectly by a flooding effect.

For purposes of this invention, it is to be understood the expression "open configuration" is also intended to allow for safety devices positioned adjacent to the electrochemical cells and purification systems, such as splash guards, shields and cages installed for minimizing the potential for injuries to operators. Hence, the confinement of the electrolysis cells or an entire water purification system of this invention inside a small room, for example, is also intended to be within the meaning of "open configuration" as appearing in the specification and claims.

A further type of electrochemical cell design is disclosed by Beck et al in U.S. Pat. No. 4,048,047. The Beck et al cell design comprises a bipolar stack of circular electrode plates separated by spacers to provide interelectrode gaps ranging from 0.05 to 2.0 mm. Liquid electrolyte is fed directly to the electrode plates through a pipeline into a central opening in the electrode stack and then outwardly so it runs down the outside of the stack. However, the electrode stack is placed in a conjoint closed housing with a covering hood to avoid loss of gaseous reactants, vapors or reaction products. Thus, the closed configuration of the Beck et al cell does not meet the criteria of an "open configuration" cell according to this invention.

While it has been pointed out the "open configuration" of the improved, highly economic electrochemical cell designs of this invention are based on the elimination of traditional closed cell designs, including plate and frame type cells and conventional tank type cells, as well as traditional partially open tank type cell designs, whether batch or continuous, it is to be understood, the expression "open configuration", as appearing in the specification and claims, also contemplates electrochemical cells which may be modified with various inserts, barriers, partitions, baffles, and the like, in some instances positioned adjacent to cell electrodes, or their peripheral edges. Such modifications can have the effect of altering electrolyte circulation and direction, and increase residency/retention time, and therefore, affect the residency time and rate of discharge of electrolyte from the cell. Notwithstanding, such modified electrochemical cells which are partially open do fall within the intended meaning of "open configuration" when the electrodes per se remain substantially accessible. Representative modified electrochemical cell designs with electrodes which remain substantially accessible that are included within the definition for "open configuration" as appearing in the claims include modified, so called "Swiss roll cell" designs wherein, for example, the closed tubular containment for the electrodes, which are superimposed onto one another and rolled up concentrically, is removed, thereby forming an "open type Swiss roll cell".

It is yet a further object of the invention to provide a more efficient electrochemical cell design which can be used in effectively treating a wide spectrum of both chemical and biological contaminants in aqueous media, but also of varying concentration (from less than a few ppm to several thousand ppm) which is both economically competitive in capital costs and power consumption to more conventional water purification systems. The electrochemical systems and methods of the invention have such significantly improved economics, as to be readily adaptable to treating via continuous processes, large volumes of industrial waste waters from manufacturing facilities, such as chemical plants, textile plants, paper mills, food processing plants, and so on.

Lower cell voltages and higher current densities are achieved with the highly economic, open configuration, especially when configured as monopolar electrochemical cells equipped with electrodes having narrow capillary interelectrode gaps. Generally, the width of the gap between electrodes is sufficiently narrow to achieve conductivity without extra supporting electrolytes or current carriers being added to the contaminated aqueous solutions. Thus, the need for adding supporting electrolyte to the contaminated aqueous electrolyte solution as supporting current carrier can be avoided.

It is thus a further object of the invention to provide for improved, more economic and safer continuous, semi-continuous or batch methods for electropurification of contaminated aqueous solutions by the steps of:

(i) providing an electrolysis cell comprising at least one anode and at least one cathode as electrodes positioned in an electrolyzer zone. The electrodes are spaced sufficiently close to one another to provide an inter-electrode gap capable of minimizing cell voltage and IR loss. Means are provided for direct feeding a contaminated aqueous solution to the electrodes in the electrolyzer zone. Means are provided for regulating the residency time of the electrolyte solution in the electrolyzer zone during electrolysis for modification of the contaminants. The electrolysis cell is characterized by "open configuration" as previously described;

(ii) directly feeding into the electrolyzer zone of the electrolysis cell a contaminated aqueous electrolyte solution, and (iii) imposing a voltage across the electrodes of the electrolysis cell to modify, and preferably destroy the contaminants in the aqueous electrolyte solution.

It will be understood that generally the process will include the step of recovering a purified electrolyte solution from the electrolysis cell. However, the invention contemplates direct delivery of purified aqueous solutions to a watershed, for example, or optionally to other post-treatment stations.

As previously mentioned, the methods are performed in an open configuration electrolysis cell which may be either monopolar or bipolar configuration. Because of the open configuration, as defined herein, the electrochemical cells of this invention can be readily configured to a monopolar design. This is especially advantageous since higher current densities would be desirable in electrolyzing contaminated aqueous solutions having relatively low conductivities while still also maintaining low cell voltages. Likewise, the improved electrochemical cells of this invention may have a bipolar configuration, especially for large installations to minimize busbar and rectifier costs.

Typically, in the monopolar open cell design electrical connections are made to each electrode. Whereas in bipolar configurations electrical connections are made to the end electrodes. However, many applications require increased electrode surface area, especially in scaling up from a laboratory scale electrochemical cells to pilot scale, and finally to commercial size open cells. It would be advantageous if in scaling up cells one could achieve a more efficient cell design for performing the processes of this invention, and minimize capital and operating costs even further.

It is therefore still another principal object to provide alternative, more economic embodiments of the open electrolysis cell concept of this invention, wherein faces of multiple porous electrodes are positioned adjacent to one another and arranged either in a vertical plane or superimposed horizontally relative to one another in the format of a stack. The porous electrodes, usually meshes or screens, are in electrical contact with one another, with each electrode stack requiring but a single feeder electrode for introducing a voltage thereto. Hence, by arranging the electrodes in these representative formats, the effective electrode surface area is significantly increased without also increasing the number of external electrical contacts otherwise required to the power source. By layering the electrodes connection costs are minimized, while also realizing capital savings in electrode purchases. Other benefits include improved efficiency of operation with the open cell configuration, reduced power consumption and lower operating costs, as a result of lower cell voltages.

Accordingly, the invention contemplates an embodiment of the "open cell" configuration wherein the electrolysis cell comprises at least one anode and at least one cathode as electrodes positioned in an electrolyzer zone. At least one of the electrodes comprises a plurality of conductive porous elements positioned adjacent to and in electrical contact with one another. Means are provided for directly feeding an aqueous electrolyte solution to the electrodes in the electrolyzer zone, and for regulating the residency time of the electrolyte solution in the electrolyzer zone.

As an alternative, the electrode consisting of a plurality of conductive porous elements may be in combination with a solid, non-porous conductive electrode element.

Also included is a method for electropurification of contaminated aqueous solutions by the steps of:

(i) providing an open configuration electrolysis cell with at least one anode and at least one cathode as electrodes positioned in an electrolyzer zone. At least one of the electrodes comprises a plurality of conductive porous elements, as for example, mesh or screen, positioned adjacent to and in electrical contact with one another. Means are provided for direct feeding a contaminated aqueous electrolyte solution to the electrodes in the electrolyzer zone. Means are also provided for regulating the residency time of the aqueous electrolyte solution in the electrolyzer zone for modification of contaminants therein;

(ii) a contaminated aqueous electrolyte solution is introduced into the electrolysis cell of (i), and (iii) a voltage applied across the electrodes of the electrolysis cell to modify the contaminants in the electrolyte in the aqueous electrolyte solution.

The improved electropurification methods of the invention also contemplate the treatment of aqueous solutions contaminated with metal ions. Often, they are toxic substances from plating bath effluents, metal stripping baths, biocide formulations and paints, and may be sequestered by a complexing agent, surfactant or reducing agent. The electropurification methods of the invention destroy the complexing agent, surface active agent or reducing agent to release the hazardous metal for further treatment in the electrolysis cell, or alternatively, for instance, transferred to a metal recovery cell for plating out metals from solution.

While the electrolysis cells disclosed herein have as a principal utility the electropurification of contaminated solutions, the "open" cell configuration of this invention can be readily employed in other useful applications. Representative examples include the electrochemical synthesis of inorganic and organic compounds, such as iodate and periodate salts, chlorine dioxide, persulfate salts, and dimers via the Kolbe method of electrolysis of carboxylic acids, or by electrohydrodimerization of activated olefins, the electrolysis of water to form hydrogen and oxygen, and so on.

It is therefore yet a further principal object of the invention to provide electrosynthesis processes in the production of useful products, by the steps of:

(i) providing an electrolysis cell with an open configuration wherein the cell is equipped with at least one anode and at least one cathode as electrodes positioned in an electrolyzer zone. At least one of the electrodes comprises a plurality of conductive porous elements, for example, mesh or screens, positioned adjacent to and in electrical contact with one another. Means are provided for direct feeding of an electrolyte solution to the electrodes in the electrolyzer zone. Also included are means for regulating the residency time of the electrolyte solution in the electrolyzer zone;

(ii) introducing into the electrolysis cell of (i) an electrolyte comprising a solution of an electroactive substrate, such as an inorganic salt, e.g., aqueous solution of an alkali metal chloride when making bleach, an iodate salt when making periodate, an aqueous solution of an acid, etc., and (iii) imposing a voltage across the electrodes of the electrolysis cell to electrolyze the electrolyte solution to form a useful chemical product.

This embodiment of the invention includes methods for electrosynthesis of a useful product wherein the electrolysis cell is equipped with a porous diaphragm or permselective membrane.

BRIEF DESCRIPTION OF THE DRAWINGS

For a further understanding of the invention and its characterizing features reference should now be made to the accompanying drawings wherein.

DESCRIPTION OF THE PREFERRED EMBODIMENTS

Figure 1:
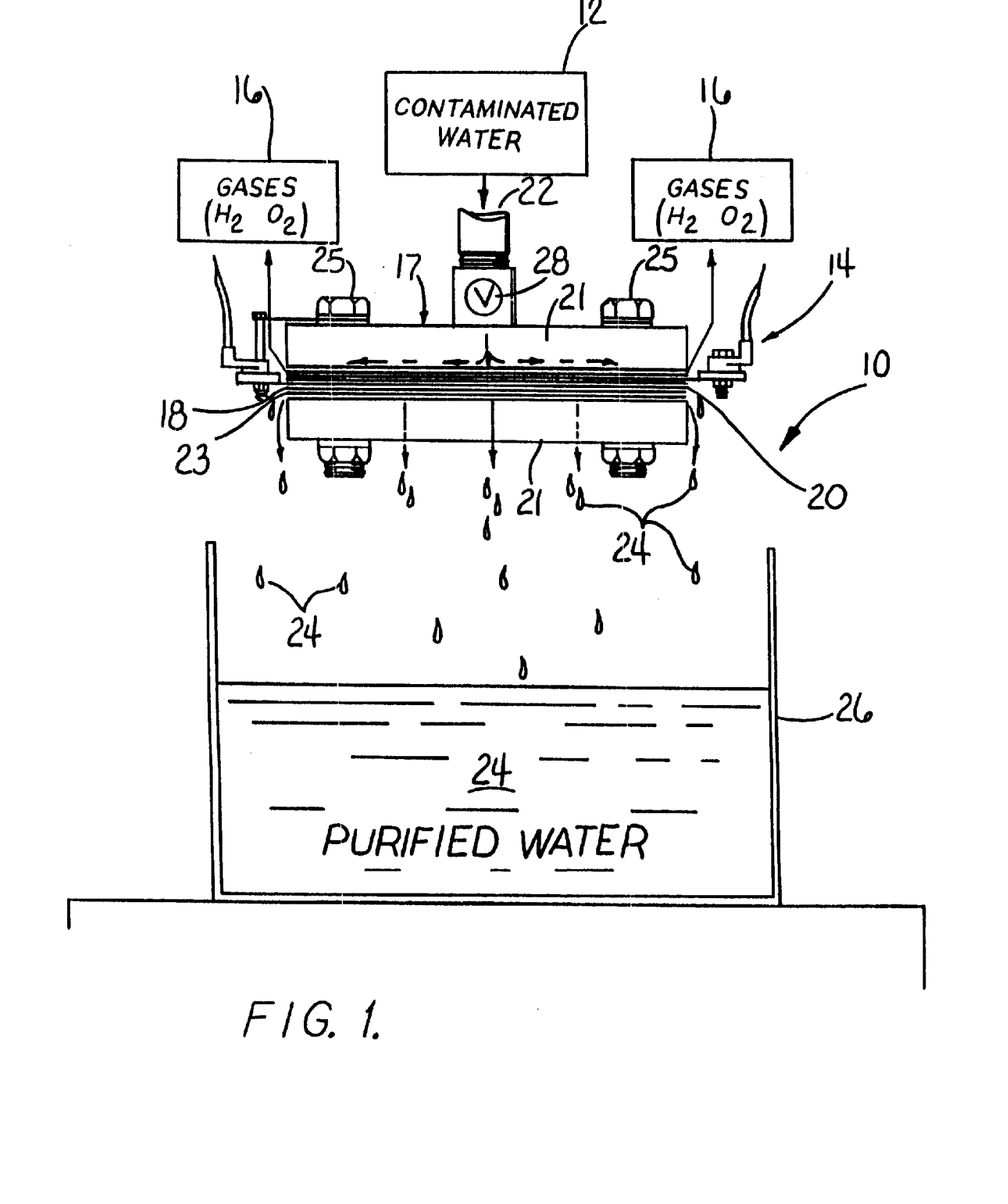
FIG. 1 is a side elevational view illustrating a first embodiment of a direct feed, open configuration, controlled leakage electrochemical cell of the invention wherein the electrodes are positioned above a water collection vessel in a horizontal orientation.

Turning first to FIG. 1 there is illustrated an electrochemical cell 10 for purification of contaminated aqueous solutions, as previously discussed, represented by contaminated water 12 passing through inlet 22. The contaminated water 12 is treated in the electrolyzer zone 14 of cell 10 which is illustrated in a fully open configuration allowing gaseous by-products of the electrolysis reaction, such as oxygen and hydrogen 16 to be released to the atmosphere. It may be desirable in some instances to collect certain potentially hazardous gases generated during the electrolysis reaction to avoid discharging to the atmosphere. Chlorine, for example, may be generated at the anode during electrolysis of aqueous effluent streams containing brine or sea water. Such gases can be recovered, for Instance, by a vacuum powered hood device of conventional design (not shown) positioned adjacent to electrochemical cell 10.

Figure 4:
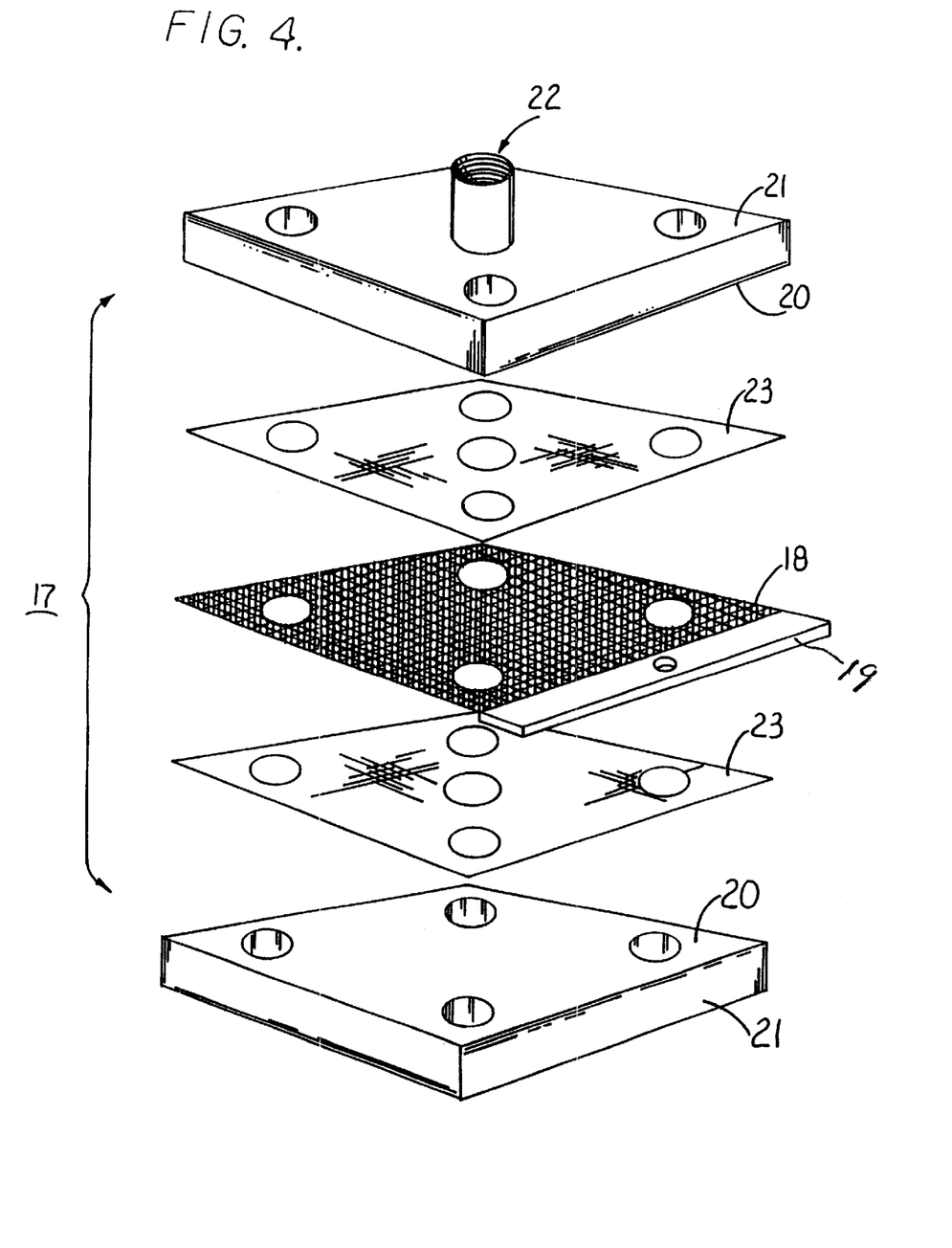
FIG. 4 is an exploded view of the electrode cell stack of FIG. 1.

The electrolyzer zone 14 includes an electrode stack 17 shown in a horizontal orientation in FIGS. 1 and 4, and comprises at least one cathode 18 and at least one anode 20. Anodes 20, for example, may also serve as end plates 21 for holding an assembly of electrodes, spacers, and separators, whenever used, into an assembled electrode stack 17. Non-conductive electrode spacers 23 positioned between electrodes provide the desired interelectrode gap or spacing between adjacent anodes and cathodes. While FIGS. 1 & 4 of the drawings may be shown with only a central cathode with anodes on opposite sides of cathode 18, for example, it is to be understood the electrode stacks may be formed from several alternating anodes, spacers, cathodes, and so on, with bolting means 25 running through the stack and end plates for maintaining the components in a structurally stable assembly.

The end plates, electrodes and spacers may have a generally rectangular geometry. However, any number of possible alternative geometrical shapes and sizes are within the purview of the invention, including square, round or circular configurations, to name but a few. Contaminated aqueous electrolyte solutions are fed directly to the electrodes in electrolyzer zone 14 via supply line 22. Supply line 22 is shown centrally positioned relative to anode/end plate 21. The electrodes, which may be solid and planar, are preferably mesh/screen-type materials. This enables the aqueous electrolyte solutions entering the electrode stack to directly engage with the electrodes, and in so doing flow radially across the face of the individual electrode surfaces within the stack toward their peripheral edges. In addition, the entering solution usually flows axially, or normal to the longitudinal axis of the plane of the electrodes, so the contaminated aqueous solution simultaneously cascades over and through the electrode stack in a fountain-like effect to maximize contact with electrode surfaces in the process. Purified water 24, free or virtually free of contaminants exiting electrolyzer zone 14, can be collected in an open tank 26, or funneled into a discharge line (not shown) for emptying into a natural watershed, etc.

It will be understood the direct feed of contaminated aqueous solutions to the electrolyzer zone need not be centrally positioned relative to the electrode stack, as illustrated in FIGS. 1–4. Alternative direct feed routes include inverting the point of feed, so that contaminated aqueous solutions are fed from the bottom of the electrode stack, or at an oblique or obtuse angle to the planar surface of the electrodes. In addition, the direct feed entry point may also be axial with the edge of the planar surface of the electrodes wherein contaminated solution is delivered to the peripheral edge of an electrode stack.

A convenient means for regulating the residency time of the contaminated aqueous solution in electrolyzer zone 14 and for controlling leakage of decontaminated and purified water 24 therefrom can be through valve 28 and/or pumping means of conventional design (not shown). The flow rate of contaminated water directly entering the electrode stack and exiting the stack as decontaminated water can be regulated through manual or automated flow control valve 28 of standard design. The flow rate (liters/minute)is adjusted, so it is sufficient to provide effective destruction of pollutants by the time the treated solution exits the electrolyzer zone. Persons of ordinary skill in the art having the benefit of this disclosure will also recognize the performance of the electrochemical cells of this invention may be optimized by alternative means, such as increasing the path of the solution in the electrolyzer zone. The installation of baffles, for instance, can increase the dwell time of the solution in the electrolyzer zone. Alternative means include enlarging the surface area of the electrodes for reducing the residency time in the electrolysis zone. In practice, electrochemists skilled in the art will also recognize the performance of the cell can be increased with higher current densities.

Because of cell geometry, and the ability to conveniently use both monopolar and bipolar configurations, practically any electrode material can be employed, including metals in the form of flat sheet, mesh; foam or other materials, such as graphite, vitreous carbon, reticulated vitreous carbon and particulate carbons. This also includes combinations of electrode materials, such as bilayer elements comprising two metal layers separated by appropriate insulating or conductive materials, and so on.

Representative examples of useful anodes would include those generally known as, noble metal anodes, dimensionally stable anodes, carbon, vitreous carbon and graphite-containing anodes, doped diamond anodes, substoichiometric titanium oxide-containing anodes and lead oxide-containing anodes. More specific representative examples include platinized titanium noble metal anodes; anodes available under the trademark DSA-$O_2$, and other anodes, such as high surface area type anodes like felts, foams, screens, and the like available from The Electrosynthesis Co, Inc., Lancaster, New York. Other anode materials comprise ruthenium oxide on titanium, platinum/iridium on titanium, iridium oxide on titanium, silver oxide on silver metal, tin oxide on titanium, nickel III oxide on nickel, gold, substoichiometric titanium oxides, and particularly the so called Magneli phase titanium oxides having the formula $TiO_x$ wherein x ranges from about 1.67 to about 1.9. A preferred specie of substoichiometric titanium oxide is $Ti_4O_7$. Magneli phase titanium oxides and methods of manufacture are described in U.S. Pat. No. 4,422,917 (Hayfield) which teachings are incorporated-by-reference herein. They are also commercially available under the trademark Ebonex®. Where electrocatalytic metal oxides, like $PbO_2$, $RuO_2$, $IrO_2$, $SnO_2$, $Ag_2O$, $Ti_4O_7$ and others are used as anodes, doping such oxides with various cations or anions has been found to further increase the electrocatalytic oxidation behavior, stability, or conductivity of the decontamination reactions of this invention. The selection of appropriate anode materials is made by considering such factors as cost, stability of the anode material in the solutions being treated and its electrocatalytic properties for achieving high efficiencies.

Suitable cathode materials include metals, such as lead, silver, steel, nickel, copper, platinum, zinc, tin, etc., as well as carbon, graphite, Ebonex, various alloys, and so on. Gas diffusion electrodes are also useful in the methods of this invention. In this regard, they may be used as cathodes in converting oxygen or air to useful amounts of peroxide, minimizing hydrogen evolution and/or for lowering cell voltages. The electrode material, whether anode or cathode, may be coated with an electrocatalyst, either low or high surface area. Higher surface area electrodes, for example, expanded metal screens, metal or graphite beads, carbon felts, or reticulated vitreous carbon are especially useful in achieving higher efficiencies for destruction of toxic or hazardous substances when present at low concentrations in the aqueous electrolyte.

Specific anode and cathode materials are selected on the basis of cost, stability and electrocatalytic properties. For example, persons of ordinary skill in the art of electrochemistry will recognize which electrode material to select when it is desired to convert chloride to chlorine; water to ozone, hydroxyl radicals or other reactive oxygen species; oxygen or air to hydrogen peroxide or hydroxyl radicals via electrochemically generated Fenton's reagent using for instance, a slowly dissolving iron-containing metal anode; and catalytic reduction of nitrate to nitrogen or of organohalogen compounds to halide ions and organic moieties of lesser toxicity.

Of special importance in the selection of electrocatalytic anode and cathode materials occurs when treating aqueous solutions comprising complex mixtures of pollutants wherein electrode materials may be selected for paired destruction of pollutants. For example, an aqueous stream contaminated with organics, microorganisms and nitrate pollutants may be treated simultaneously in the same electrochemical cell using paired destruction methods with a reactive oxygen species generating anode, such as platinum on niobium or Ebonex for destruction of microorganism and oxidation of organics. In addition, the same cell could also be equipped with a lead or other electrocatalytic cathode material designed for nitrate destruction.

As previously mentioned, non-conductive electrode spacers 23 provide the desired interelectrode gap or spacing between adjacent anodes and cathodes. The thickness of spacers 23, which are non-conductive, insulative porous mesh screens fabricated from polymeric materials, such as polyolefins, like polypropylene and polyethylene, determines the width of the interelectrode gap. Alternatively, it is permissible to employ ionic polymer spacers which can effectively increase the ionic conductivity of the cell, so as to reduce cell voltage and operating costs further. Ion-exchange resins of suitable dimensions, like cation and anion exchange resin beads are held immobile within the gap between electrodes.

For most applications, the interelectrode gap ranges from near zero gap, to avoid electrode shorting, to about 2 mm. More specifically, this very small capillary size gap is preferably less than a millimeter, ranging from 0.1 to <1.0 mm. The very small interelectrode gap makes possible the passage of current through relatively non-conductive media. This is the case, for example, in water contaminated with organic compounds. Thus, with the present invention it is now possible to destroy contaminants in solution without adding any current carrying inorganic salts to increase the ionic conductivity of the aqueous media. Furthermore, the very narrow interelectrode gap provides the important advantage of lower cell voltages which translates into reduced power consumption and lower operating costs. Hence, the combination of open configuration electrochemical cells and very narrow interelectrode gaps of this invention provide for both lower initial capital costs, as well as lower operating costs. This achievement is especially important in large volume applications, as in the purification of drinking water, and wastewater, according to the claimed processes.

Figure 2:
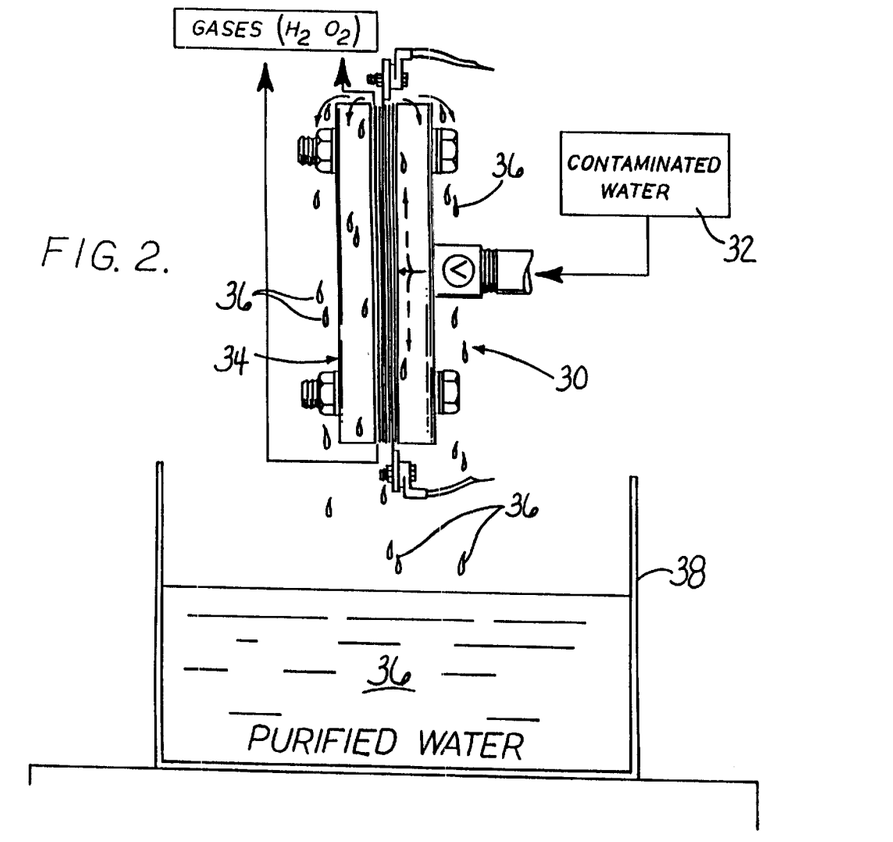
FIG. 2 is a side elevational view of the electrochemical cell of FIG. 1 except the electrodes are in a vertical orientation.

FIG. 2 represents a further embodiment of the electrochemical cells of this invention wherein the electrolyzer zone 30 is also in an open configuration. The electrolyte 32 is fed directly to the electrode stack 34 which is in a vertical orientation. As a result, treated aqueous solution 36 is shown exiting mainly from both the top and bottom peripheral edges of electrode stack 34. This may be altered further depending on the use of baffles, for instance, in controlling residency time for the solution being treated. Purified solution is collected in vessel 38 below electrolyzer zone 30.

Figure 3:
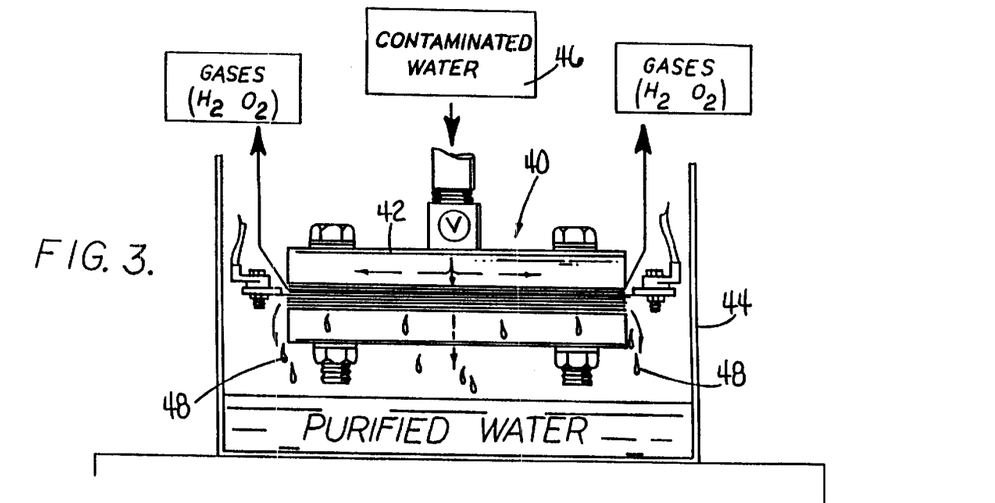
FIG. 3 is a side elevational view illustrating a second embodiment of a direct feed, open configuration, controlled leakage electrochemical cell of the invention wherein the electrodes are positioned in the interior of an open cell housing.

FIG. 3 represents still a third embodiment of the invention wherein the electrolyzer zone 40 comprises an electrode stack 42, as discussed above, positioned in the interior of an open housing/tank 44. Housing 44 is open at the top allowing gaseous by-products of the electrolysis reaction, like hydrogen and oxygen, for instance, to be readily discharged into the atmosphere or collected through aid of an appropriate device, such as a hood (not shown). Aqueous contaminated electrolyte solution 46 is fed directly to electrode stack 42 positioned in open housing 44, unlike other tank cells wherein the electrodes receive solution indirectly as a result of their immersion in the solution delivered to the tank. Purified water 48 cascading downwardly as a result of gravitational forces collects at the bottom of the interior of housing 44, and is withdrawn.

Figure 5:
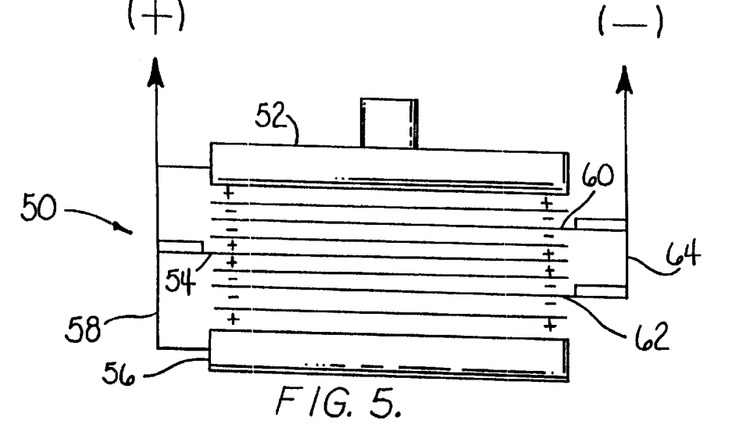
FIG. 5 is a side elevational view of an electrode stack of the invention connected in a monopolar configuration.

An important advantage of the open configuration electrochemical cells of this invention resides in their ability to be readily adaptable to either a monopolar or bipolar configuration. In this regard, FIG. 5 illustrates a monopolar open configuration electrochemical cell. In the monopolar cell of FIG. 5, anodes 52, 54 and 56 each require an electrical connector as a current supply, in this case through a bus 58 as a common "external" supply line. Similarly, cathodes 60 and 62 each require an electrical connection shown through a common bus 64. It is also characteristic of the monopolar cell design that both faces of each electrode are active, with the same polarity.

Because water purification for a municipality, in general, is a large volume application, lowest possible cell voltages are essential in order to minimize power consumption. The open configuration, monopolar cell design of the present invention in combination with very narrow interelectrode gaps offers not only the benefits of lower initial capital costs, but also low operating costs, due to lower internal resistances, lower cell voltages and higher current densities. This combination is especially desirable when treating contaminated aqueous media of relatively low conductivity without the addition of inorganic salts as current carriers in accordance with certain embodiments of this invention, e.g., aqueous solutions contaminated with non-polar, organic solvents.

The open configuration, monopolar, controlled leakage electrochemical cells with very narrow interelectrode gaps of this invention are particularly unique in light of the Beck et al cells of U.S. Pat. No. 4,048,047. The closed configuration of the electrochemical cells of Beck et al make it very difficult and costly to achieve a monopolar connection with high current densities associated with external electrical contacts to each electrode. By contrast, with the open configuration of the electrochemical cells of this invention electrical connections to individual electrodes are facilitated, irrespective of whether the cell is a monopolar or bipolar design. Thus, the closed, bipolar electrochemical cell configuration of Beck et al would not be economic and cost competitive with the improved electrochemical cells of the present invention, or with other non-electrochemical technologies used in high volume water purification processes.

Figure 6:
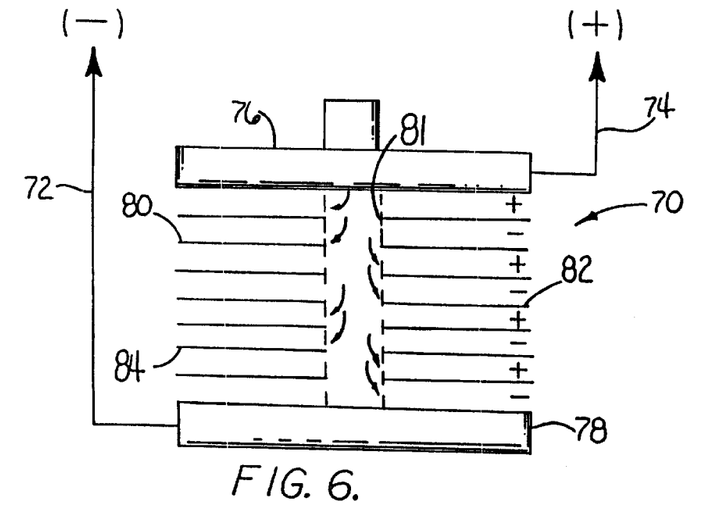
FIG. 6 is a side elevational view of an electrode stack of the invention connected in a bipolar configuration.

As previously indicated, the open configuration, controlled leakage electrochemical cells of this invention having very narrow capillary interelectrode gaps are also readily adaptable to bipolar configuration. FIG. 6 illustrates open configuration bipolar cell 70, according to the present invention, requiring only two "external" electrical contacts 72 and 74 through two end electrodes/end plates 76 and 78. Each of inner electrodes 80, 82 and 84 of the bipolar cell has a different polarity on opposite sides. While the bipolar cell can be quite economic in effectively utilizing the same current in each cell of the electrode stack, one important aspect of the invention relates to treating solutions by passing a current through relatively non-conductive media using very narrow interelectrode gaps. That is, the contaminated aqueous solutions can have relatively low conductivities, about equivalent to that of tap water. In order to efficiently treat such solutions it would be desirable to operate at higher current densities. The monopolar cell configurations of the invention enable operating at desired low cell voltages and high current density. While not specifically illustrated, it will be understood standard power supplies are utilized in the electrolysis cells of the invention, including DC power supply, AC power supply, pulsed power supply and battery power supply.

The invention also contemplates open configuration electrochemical cells with distributor means for contaminated aqueous electrolyte solutions, such as a length of pipe 81 with multiple openings or pores, or a feeder tube extending from the contaminated aqueous electrolyte feed inlet through the depth of the electrode stack in the electrolyzer zone. This can provide more uniform flow of solution to the electrode elements. Especially useful for stacks containing many electrode elements, these porous tubes of metal or plastic material, of sufficient porosity, diameter and length, are applicable to monopolar, bipolar, and for example, Swiss roll cells of open configuration. For deep cell stacks with electrode elements, each of larger surface area, more than one porous feeder tube may be provided, manifolded together with the feed inlet conduit.

The open configuration, bipolar type, controlled leakage electrochemical cells of the present invention can be most effectively used in the purification of aqueous solutions possessing greater ionic conductivities than those previously discussed, allowing for economical operation at lower current densities. In each instance, the open configuration of the electrochemical cells of this invention facilitates their electrical connection, whether the cell is a monopolar or bipolar design.

Most desirably, large volume applications like water purification require low capital and operating costs in order to be economically attractive. These inventors found that capital costs are largely reduced by eliminating the need for precision machined components, gasketing, costly membranes and cell separators. Lower operating costs can be achieved through lower cell voltages from narrow interelectrode gaps and lower IR from elimination of cell membranes and separators, i.e., undivided electrochemical cells. The smaller interelectrode gap, however, also makes possible the operation of the cells of this invention in an organic media, for example, containing low concentrations of supporting electrolyte, with a variety of electrode, insulator materials, and so on. Many of such applications would be readily adaptable to the open cell configuration of this invention, but with use of a cell divider forming anolyte and catholyte compartments, such as membranes or cell separators. Examples of useful processes for the electrochemical cells of this invention would include mediated reactions in electrochemical synthesis in which the objective of the membrane or separator would be to prevent reduction of anodically produced species at the cathode, and/or oxidation of cathodically produced species at the anode.

Figure 7:
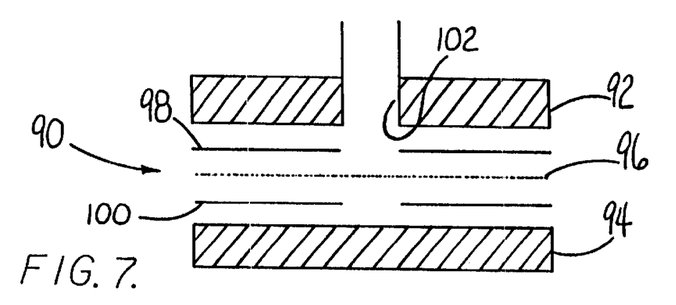
FIG. 7 is an elevational view of an electrode stack compartmentalized with a separator.

FIG. 7 is a representative example of an open configuration electrochemical 90 having anode/end plates 92 and 94 with central cathode 96 and cation exchange membranes 98 and 100 positioned between the electrodes. Membranes 98 and 100 prevent mixing of the anolyte and catholyte in the cell while the solution is allowed to flow through opening 102 in the center of the membrane.

Those embodiments of the electrochemical cells employing a diaphragm or separator are preferably equipped with ion-exchange membranes, although porous diaphragm type separators can be used. A broad range of inert materials are commercially available based on microporous thin films of polyethylene, polypropylene, polyvinylidene-difluoride, polyvinyl chloride, polytetrafluoro-ethylene (PTFE), polymer-asbestos blends and so on, are useful as porous diaphragms or separators.

Useful cationic and anionic type permselective membranes are commercially available from many manufacturers and suppliers, including such companies as RAI Research Corp., Hauppauge, N.Y., under the trademark Raipore; E.I. DuPont, Tokuyama Soda, Asahi Glass, and others. Generally, those membranes which are fluorinated are most preferred because of their overall stability. An especially useful class of permselective ion exchange membranes are the perfluorosulfonic acid membranes, such as those available from E.I. DuPont under the Nafion® trademark. The present invention also contemplates membranes and electrodes formed into solid polymer electrolyte composites. That is, at least one of the electrodes, either anode or cathode or both anode and cathode, are bonded to the ion exchange membrane forming an integral component.

While embodiments of the invention previously discussed mention electrode stacks, e.g., 17 and 34 of FIGS. 1 and 2, respectively, etc., such electrode stacks are comprised of individual, single anode and single cathode elements spaced from one another by narrow interelectrode gaps. FIG. 4 illustrates representative electrode stacks in exploded view comprising a cathode 18 consisting of a single planar screen element having its own external electrical contact 19. Non-conductive porous spacers 23 on each side of cathode 18 provide the desired interelectrode gaps separating the cathode element from adjacent end anodes 20. While FIG. 4 illustrates an electrode stack with a single cathode screen positioned between end anodes 20, it is to be understood that larger capacity commercial and semi-commercial pilot scale cells of this invention will usually have cell stacks comprising a multiplicity of alternating anodes and cathodes each having an external electrical contact when in a monopolar configuration.

Figure 8:
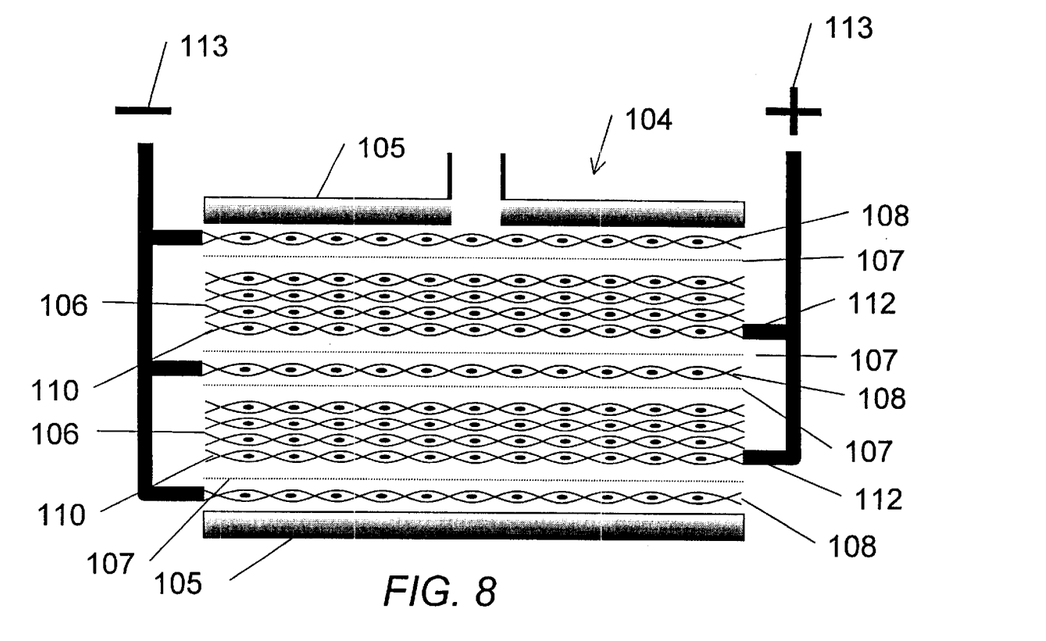
FIG. 8 is a side elevational view of an open electrochemical cell with stacks of porous electrodes connected in a monopolar configuration.
Figure 9:
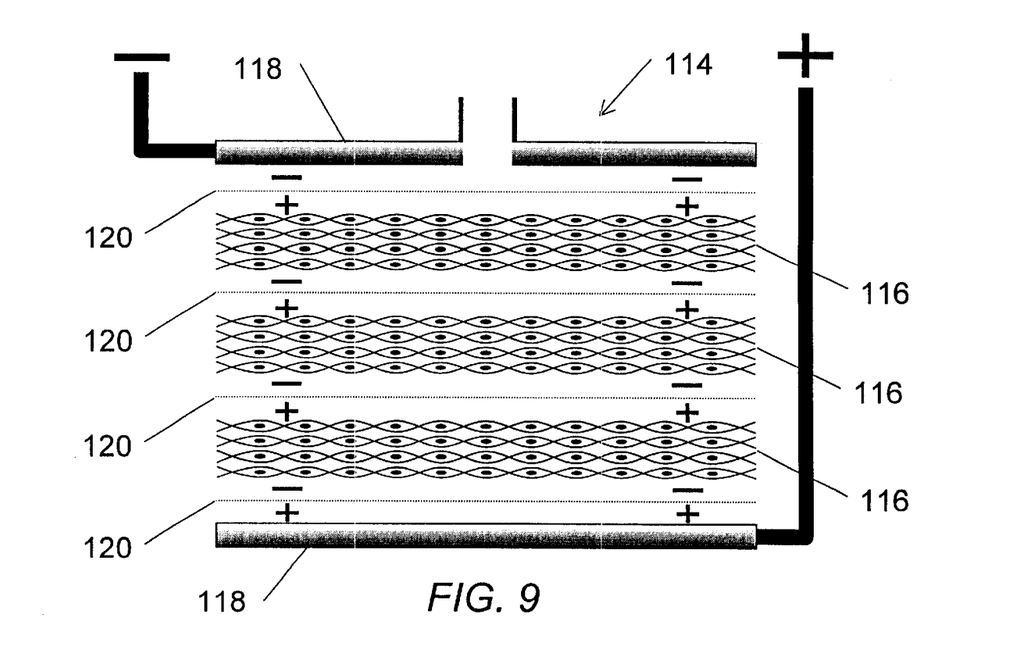
FIG. 9 is a side elevational view of an open electrochemical cell with stacks of porous electrodes connected in a bipolar configuration.

However, those scaled up versions of the electrolysis cells of this invention requiring increased electrode surface area can achieve this result more economically by stacking a plurality of individual porous electrode elements as illustrated by FIGS. 8 and 9. Multiple electrode elements consisting of conductive porous elements, for example, meshes or screens are positioned adjacent to and in electrical contact with one another in either monopolar (FIG. 8) and bipolar (FIG. 9) open cell configurations.

Either or both the anodes and cathodes of the open cell embodiment may have the multiple electrode element design. That is, an anode stack consisting of multiple electrode elements are held together in electrical contact, and may be positioned adjacent to a cathode consisting of a single electrode element, and vice versa. This is best illustrated by FIG. 8, which consists of monopolar open cell 104 held between end plates 105 with multiple porous anode elements 106 positioned between single element cathodes 108, illustrated as porous cathodes, but may also be non-porous plate electrodes. Anodes 106 are separated from cathodes 108 by means of porous non-conductive spacers 107. Advantageously, anode stacks 106 need only a single "feeder" electrode 110 for transferring a voltage on either side to other electrode elements of the same stack in contact therewith. By stacking electrode elements in this manner, the effective electrode surface can be significantly increased without increasing the number of external electrical contacts 112 to the power source 113, which would otherwise be required. This not only minimizes costs for external electrical connectors and capital costs for electrodes, but also improves efficiency of operation resulting in lower cell voltages and reduced power consumption for lower operating costs.

The conductive porous elements of the electrodes may be fabricated from metal or carbon, for instance, and can be in the form of perforated metal plates, welded wire cloth, woven wire cloth, expanded metal, carbon felts, woven carbon cloth, reticulated vitreous carbon, including metallic foams, such as nickel foam having sponge-like characteristics. Representative examples of commercially available perforated metal plates are low carbon steel sheets and micro-etched type 316 stainless steel sheets with hole patterns which are uniform and accurate in size. Welded wire cloth includes type 304 stainless steel cloth and stainless steel knitted wire mesh. Wire cloth is a woven or welded material formed from metal wire, and is available in a variety of mesh sizes. Also available is type 304 stainless steel grade. Expanded metal consists of plates which have been slit and stretched. The plates/sheets are lightweight, yet strong due to the diamond truss pattern of their openings. They are commonly fabricated from carbon steel and type 304 stainless steel.

The invention contemplates a combination of different porous materials for use as the electrode elements in a single cell to achieve a combination oxidation/reduction effect, for example. The pore density of the conductive porous elements of the electrodes may range from 1 to about 500 mesh/linear inch. The conductive porous elements may also have an open area ranging from about 10 to about 90 percent. Some elements, such as foams may have porosities ranging from 1 to 1000 pores/lineal inch and a densities ranging from 5 to about 85 percent. The electrode elements may simply be stacked in close electrical contact or welded together and to the feeder electrode, as appropriate, to ensure electrical connectivity through all members of the stack.

FIG. 9 also shows an open electrolysis cell design 114 similar to FIG. 8, but in a bipolar configuration shown with all intermediate electrode stacks 116 consisting of a plurality of porous electrode elements. Individual elements of each electrode stack are in electrical contact with other members of the same stack. Power is routed to the cell through end plate anodes 118. Stacks 116 are spaced from one another by porous spacers 120.

The optimum number of electrode elements which may be used with or without a "feeder" electrode is a function of a number of variables, including the thickness of each porous electrode element, the conductivity of the solution being treated and the overall optimum cell design. The number of electrode elements, in addition to the feeder electrode (FIG. 8) may range from 1 to 100, and more specifically, 1 to 10 electrode elements. The "feeder" electrode may be the same material of construction as the individual electrode elements, or different, provided the feeder is stable under electrolysis conditions, and is electrically conductive.

In the purification of solutions the invention provides for the treatment of low conductivity media. However, it may be necessary to add very low concentrations of inert, soluble salts, such as alkali metal salts, e.g. sodium or potassium sulfate, chloride, phosphate, to name but a few. Stable quaternary ammonium salts may also be employed. As previously mentioned, ion exchange resin beads of appropriate size can be inserted in the spaces between the electrodes to increase conductivity. This will provide further reductions in cell voltage and total operating costs.

Contaminated solutions entering the cell can range in temperature from near freezing to about boiling, and more specifically from about 40° to about 90° C. Higher temperatures can be beneficial in lowering cell voltages and increase rates of contaminant destruction. Such higher temperatures can be achieved, if needed, by preheating the incoming solution, heating the electrodes, or through IR heating in the cell, especially when solution conductivities are low, as for example in purification of drinking water. By suitably adjusting the cell voltage and residence time in the cell, beneficial temperatures in the above ranges are possible.

As a preferred embodiment of the invention, as an undivided cell, for the purification of contaminated aqueous solutions a variety of useful anode and cathode species can be generated during electrolysis which in turn aid in the chemical destruction of contaminants and the purification of the aqueous solutions. They include such species as oxygen, ozone, hydrogen peroxide, hydroxyl radical, and other reactive oxygen species. Less preferred species, although useful in the process include the generation of chlorine or hypochlorite (bleach) through the electrolysis of brine or sea water. While not wishing to be held to any specific mechanism of action for the success of the processes in the decontamination, decolorization and sterilization of aqueous solutions contaminated with toxic organics and microorganisms, several processes, including those previously mentioned, may be occurring simultaneously. They include, but are not limited to the direct oxidation of contaminants at the anode; destruction of contaminants by direct reduction at the cathode; oxygenation of the feed stream by micro bubbles of oxygen produced at the anode; degasification of volatiles in the feed stream by oxygen and hydrogen micro bubbles; IR heating in the cell; aeration of the water stream exiting the open cell, and so on.

A broad range of compounds, microorganisms and other hazardous substances, such as metal ions as previously discussed are successfully destroyed or removed in the open cell configuration of the invention employing the processes as described herein. Representative examples include aliphatic alcohols, phenols, nitrated or halogenated aromatic compounds, and so on. Color reduction or complete elimination of color can also be achieved, along with disinfection, including the destruction of viruses.

There are many kinds of metal salts in aqueous solutions, including toxic metals in ionic form in plating bath effluents, metal stripping baths, biocide formulations, paints, etc., which are difficult to remove or recover by ion exchange or by conventional chemical or electrochemical means. Such metals include the precious metals, like platinum, silver and gold, as well as non-precious metals, such as copper, nickel, cobalt and tin, to name but a few. Government regulations are becoming increasingly strict, as to maximum acceptable levels of these metals which may be discharged into our waterways. These solubilized metal solutions are often difficult to treat because of other components which may be present, typically complexing agents, surfactants, reducing agents, and other similar type materials.

Accordingly, the present invention also contemplates electropurification of aqueous solutions contaminated with hazardous metal ions by treating in the open electrolysis cells disclosed herein using the methods previously discussed. This includes decontaminating the solutions by metal reduction at the cathodes of the open cell, as well as treating metal ions from plating bath effluents, metal stripping baths, biocide formulations, paints, and other contaminated industrial aqueous solutions, wherein the metals are sequestered by various complexing agents, surfactants or reducing agents, for instance. Solution components, including complexing agents are initially destroyed electrochemically, greatly facilitating recovery/removal of metals from the solutions. Representative complexing agents may include cyanides, ferricyanides, thiosulfates, imides, hydroxycarboxylic acids, like tartaric, citric and lactic acids, and so on. This method effectively releases the ionized metal for reduction in the cell or for removal/recovery. Alternatively, the partially treated aqueous solution may be treated further outside the open cell using such methods as ion exchange, precipitation with base, by electrolysis in a metal recovery electrochemical cell, such as a Renocell™ manufactured by Renovare International. This latter method allows metal to be plated onto a high surface area cathode.

The following specific examples demonstrate the various embodiments of the invention, however, it is to be understood they are for illustrative purposes only and do not purport to be wholly definitive as to conditions and scope.

EXAMPLE I

A monopolar electrochemical cell having an open configuration was set up with an electrode stack comprising 316 stainless steel end plates each with a diameter of 12.065 centimeters and a thickness of 0.95 centimeters. The end plates were connected as cathodes. A central cathode was also assembled into the stack and consisted of 316 stainless steel mesh with 7.8×7.8 openings/linear centimeter, 0.046 centimeter wire diameter, 0.081 centimeter opening width and 41 percent open area. The anodes consisted of two platinum clad niobium electrodes manufactured by Blake Vincent Metals Corp. of Rhode Island. The anodes which were clad on both sides of the niobium substrate had a thickness of 635 micrometers, were expanded into a mesh with a thickness of about 0.051 centimeters, with 0.159 centimeter diamond shaped interstices. The spacers positioned between adjacent electrodes were fabricated from polypropylene mesh with 8.27×8.27 openings/linear centimeter, 0.0398 centimeter thread diameter, 0.084 centimeter opening and a 46 percent open area was supplied by McMaster-Carr of Cleveland, Ohio. The gap between the electrodes was approximately 0.04 centimeters, determined by the thickness of the polypropylene mesh. A schematic of the electrochemical cell corresponds to FIG. 1 of the drawings, except a hood was omitted. Recirculation of the aqueous solution between the glass collection tank and the cell was effected by means of an AC-3C-MD March centrifugal pump at a flow rate of about 1 liter/minute. A Sorensen DCR 60-45B power supply was used to generate the necessary voltage drop across the cell.

Figure 10:
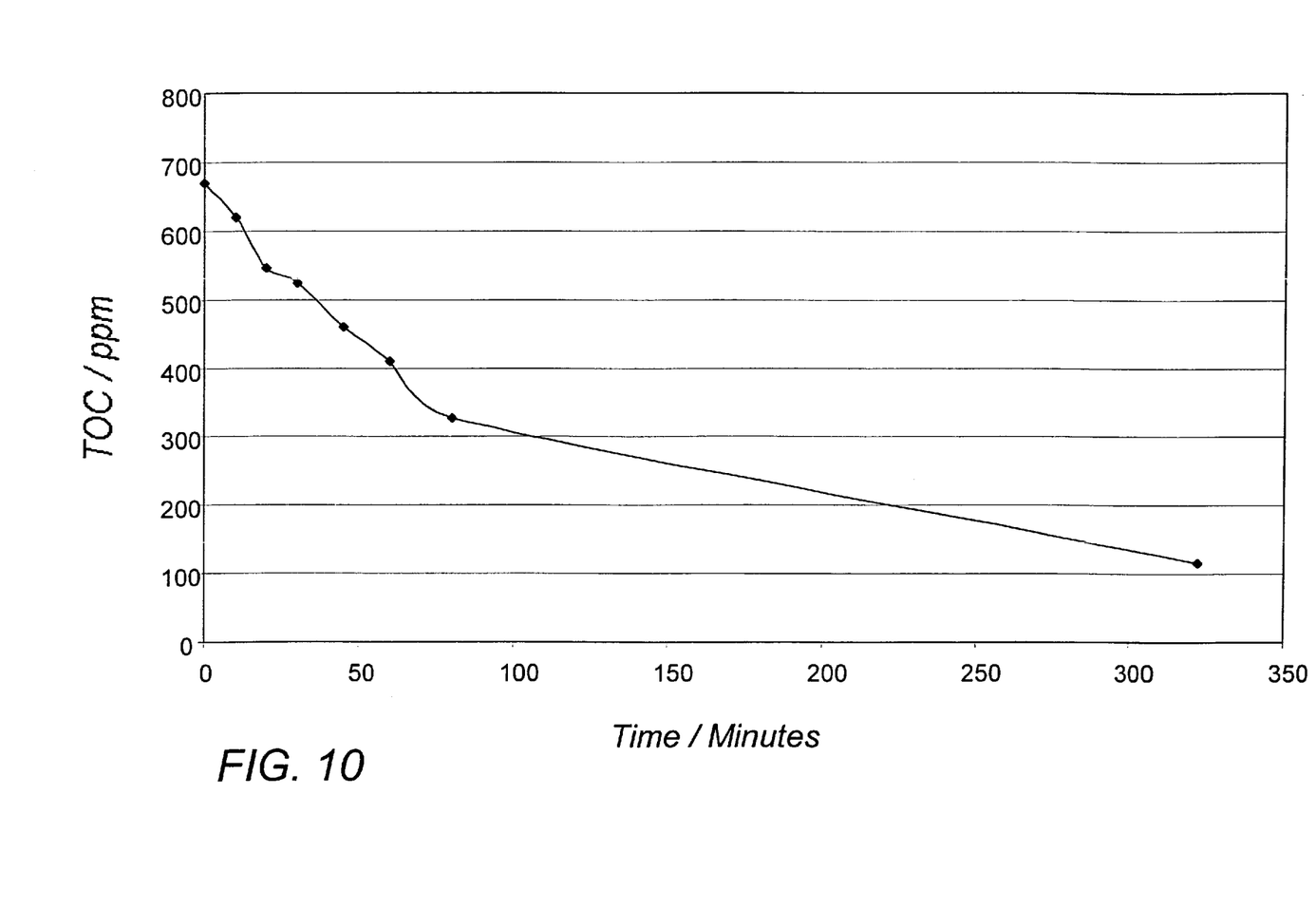
FIG. 10 illustrates the results of electropurification of an aqueous solution of phenol decontaminated according to the methods of the invention, as performed in Example I

A test solution was prepared containing 1 g of phenol in 1 liter of tap water. The solution was recirculated through the cell while a constant current of 25 amps was passed. The solution which was initially clear turned red after about 2–3 minutes into the treatment process, possibly indicating the presence of quinone-type intermediates. The initial cell voltage of 35 V decreased rapidly to 8–9 V, and the temperature of the solution stabilized at about 56–58° C. Samples taken were analyzed periodically for total organic carbon (TOC). The results, which are shown in FIG. 10, appear to suggest the decrease in TOC is from the phenol probably undergoing complete oxidation to carbon dioxide which is then eliminated as gas from the solution.

EXAMPLE II

In order to demonstrate color reduction in a textile effluent 1 liter of solution was prepared with tap water containing 0.1 g of the textile dye Remazol™ Black B (Hoechst Celanese), 0.1 g of the surfactant Tergitol™ 15-S-5 (Union Carbide) and 1 g of NaCl.

The composition of the test solution was similar to that of typical effluents produced in textile dyeing processes where even very low concentrations of Remazol Black impart very strong coloration to solutions. Remazol Black is a particularly difficult to treat textile dye. Heretofore, other methods used to treat Remazol Black, such as by ozonation or with hypochlorite bleach have failed to produce satisfactory color reduction.

The above solution containing Remazol Black was electrolyzed in the monopolar cell set up of Example I above, at a constant current of 25 amps. The cell voltage was about 25 V, and the temperature of the solution reached 52° C. The initial color of the solution was dark blue. After 10 minutes of electrolysis the color of the solution turned to pink, and after 30 minutes the solution was virtually colorless.

EXAMPLE III

A further experiment was conducted in order to demonstrate the decontamination of ground water. Humic acids are typical contaminants of ground water, produced by the decomposition of vegetable matter. Water containing humic acids is strongly colored even at low concentrations, and the elimination of the color can be difficult.

A dark brown solution in tap water was prepared containing 30 ppm of the sodium salt of humic acid (Aldrich) without any additives to increase the electrical conductivity of the solution. The solution was recirculated through a monopolar electrochemical cell similar to that used in Example I, but equipped with only one anode and two cathodes. A constant current of 10 amps was passed for 2.5 hours. The cell voltage was 24–25 volts, and the temperature reached 58° C. At the end of the experiment the solution was completely clear, demonstrating the effective destruction of humic acid.

EXAMPLE IV

A further experiment was conducted to demonstrate the effectiveness of the electrolysis cells and methods of this invention in the sterilization and chemical oxygen demand (COD) reduction in effluents from food processing plants.

250 ml of wastewater from a Mexican malt manufacturing company was treated using a monopolar, open electrochemical cell similar to that employed in Example I, except the total anode area of 6 cm². The objectives were to reduce the COD, partial or total reduction of the color, elimination of microorganisms and odor.

A current of 1 amp was passed for 150 minutes; the initial cell voltage of 22 V dropped to 17.5 V, and the temperature of the solution reached 44° C.

The results are shown in the following Table:

TABLE

|  | Initial | Final |
|---|---|---|
| COD | 1700 ppm | 27 ppm |
| Color | Yellow-Orange | Clear |
| Microorganisms | Active | Sterilized |
| Odor | Yes | No |

EXAMPLE V

A further experiment was conducted to demonstrate the effectiveness of the electrolysis cells and methods of this invention in the removal of color in a single-pass configuration.

A dark purple solution containing methyl violet dye in tap water at a concentration of 15 ppm was circulated through a monopolar, open electrochemical cell similar to that employed in Example 1, in single-pass mode, at a flow rate of 250 ml/minute. The objective was to achieve total reduction of the color.

A current of 25 amp was passed; the cell voltage was 25 V, and the temperature of the solution reached 65° C.

After a single pass through the cell a clear solution was obtained.

EXAMPLE VI

An experiment can be conducted to demonstrate the utility of the open configuration electrochemical cell in the electrosynthesis of chemicals, in this instance sodium hypochlorite.

The electrochemical cell of Example I is modified by replacing the anodes with catalytic chlorine evolving anodes, such as DSA® anodes manufactured by Eltech Systems. A solution of brine containing 10 g of sodium chloride per liter is introduced into the electrolyzer zone wherein chlorine is generated at the anode and sodium hydroxide is produced at the cathode. The chlorine and caustic soda are allowed to react in the cell to produce a dilute aqueous solution of sodium hypochlorite bleach.

EXAMPLE VII

To demonstrate the open cell configuration employing electrodes comprising a plurality of conductive porous elements positioned adjacent to and in electrical contact with one another, an experiment is performed using the monopolar cell configuration illustrated in FIG. 8. The cell is equipped with a Pt/Nb woven mesh anode having 10 strands per linear inch. Two of the Pt/Nb screens are in electrical contact and stacked on top of a third Pt/Nb screen, as the feeder electrode, which in turn is connected to the positive terminal of a DC power supply. The cathode element is a single nickel screen connected to the negative terminal of the DC power supply.

The electrolyte to be treated consists of 5 g of sodium chloride added to one liter of an aqueous electroless nickel plating effluent at 60° C., containing 60 g of nickel salt, 25 g sodium hypophosphite, and a COD of 20,000 ppm. Electrolysis is conducted at 55 mA/cm², at a cell voltage of 5.5V until the COD of the effluent drops to about 10 percent of its initial value. The effluent is then treated in an electrochemical cell containing a high surface area carbon cathode to plate out most of the nickel remaining in solution.

This demonstrates the destruction of complexing agents in electroless plating bath effluent and release of metal ions for recovery by plating means.

While the invention has been described in conjunction with various embodiments, they are illustrative only. Accordingly, many alternatives, modifications and variations will be apparent to persons skilled in the art in light of the foregoing going detailed description, and it is therefore intended to embrace all such alternatives and variations as to fall within the spirit and broad scope of the appended claims.

We claim:

1. An electrolysis cell, which comprises at least one anode and at least one cathode as electrodes positioned in an electrolyzer zone, conduit means for introducing an electrolyte to said electrodes for electrolysis, said electrolysis cell having an open configuration, and excluding a cell housing intended for retaining an electrolyte solution in said electrolyzer zone.

2. The electrolysis cell of claim 1 including means positioned in proximity to said electrodes for aiding in managing flow, circulation or residency time of electrolyte, or for shielding and/or guarding the electrolyzer zone.

3. The electrolysis cell of claim 2 wherein the means positioned in proximity to said electrodes for aiding in managing flow, circulation or residency time of electrolyte, or for shielding and/or guarding the electrolyzer zone is a member selected from the group consisting of baffles, inserts, barriers, open tank, partitions and cages.

4. The electrolysis cell of claim 1, wherein at least one of said electrodes comprises a plurality of conductive porous elements positioned adjacent to and in electrical contact with one another.

5. The electrolysis cell of claim 4 wherein the conductive porous elements of the electrodes are fabricated from metal or carbon.

6. The electrolysis cell of claim 4 wherein said conductive porous elements of the electrodes are independently selected from the group consisting of perforated metal, welded wire cloth, woven wire cloth, expanded metal, carbon felt, woven carbon cloth, reticulated vitreous carbon and metallic foam.

7. The electrolysis cell of claim 4 wherein the electrodes having a plurality of conductive porous elements comprise a feeder electrode and from 1 to 100 additional conductive porous elements in electrical contact with said feeder electrode.

8. The electrolysis cell of claim 4 wherein the electrodes having a plurality of conductive porous elements comprise a feeder electrode and from 1 to 10 additional conductive porous elements in electrical contact with said feeder electrode.

9. The electrolysis cell of claim 4 wherein said conductive porous elements have a pore density ranging from 1 to about 500 mesh/linear inch.

10. The electrolysis cell of claim 4 wherein said conductive porous elements have an open area ranging from about 10 to about 90 percent.

11. The electrolysis cell of claim 4 wherein said conductive porous elements have a porosity of 1 to 1000 pores/lineal inch and a density ranging from about 5 to about 85 percent.

12. The electrolysis cell of claim 4 wherein the electrodes comprising a plurality of said conductive porous elements are arranged as electrode stacks.

13. The electrolysis cell of claim 12 wherein said electrode stacks are connected in a monopolar configuration.

14. The electrolysis cell of claim 12 wherein said electrode stacks are connected in a bipolar configuration.

15. The electrolysis cell of claim 1 further characterized by controlled leakage of electrolyte solution and/or gaseous by-products.

16. The electrolysis cell of claim 1 which is an electropurification cell for treating contaminated aqueous solutions.

17. The electrolysis cell of claim 1 which is an electrosynthesis cell for production of organic or inorganic chemicals.

18. The electrolysis cell of claim 1 wherein said electrodes are connected in a monopolar configuration.

19. The electrolysis cell of claim 1 wherein said electrodes are connected in a bipolar configuration.

20. The electrolysis cell of claim 1 wherein at least one of the electrodes comprises one or more conductive porous elements in combination with a non-porous conductive electrode element.

21. A method for electropurification of a contaminated solution, which comprises the steps of:
  (i) providing an electrolysis cell comprising at least one anode and at least one cathode as electrodes positioned in an electrolyzer zone, at least one of said electrodes comprising a plurality of conductive porous elements positioned adjacent to and in electrical contact with one another, conduit means for introducing an electrolyte to said electrodes for electrolysis, said electrolysis cell having an open configuration, and excluding a cell housing intended for retaining an electrolyte solution in said electrolyzer zone;
  (ii) introducing into the electrolysis cell of (i) a contaminated electrolyte solution, and
  (iii) imposing a voltage across the electrodes of said electrolysis cell to electrolyze the contaminated solution to modify the contaminants therein.

22. The electropurification method of claim 21 including the step of collecting the modified electrolyte solution from said electrolysis cell.

23. The electropurification method of claim 21 wherein the aqueous electrolyte solution comprises contaminants selected from the group consisting of organic compounds, inorganic compounds, microorganisms, viruses, metal ions and mixtures thereof.

24. The electropurification method of claim 23 wherein said electrodes of the electrolysis cell are connected in a monopolar configuration.

25. The electropurification method of claim 23 wherein said electrodes of the electrolysis cell are connected in a bipolar configuration.

26. The electropurification method of claim 23 wherein the aqueous electrolyte solution comprises microorganisms selected from the group consisting of bacteria, spores, cysts, protozoa, fungi and mixtures thereof.

27. The electropurification method of claim 21 wherein the aqueous electrolyte solution introduced into the electrolysis cell comprises a dye or other color producing contaminants, and the modified aqueous electrolyte solution recovered from said electrolysis cell is substantially color-free.

28. The electropurification method of claim 21 wherein electrolysis is conducted with the introduction of a current carrier to the aqueous electrolyte solution in an amount sufficient to enhance the destruction of contaminants.

29. The electropurification method of claim 28 wherein the current carrier is an alkaline substance or an acidic substance selected from the group consisting of acid, acid salt and acidic compound.

30. The electropurification method of claim 21 including the step of adding sufficient salt to the contaminated aqueous electrolyte solution to provide an active halogen residue in the purified water.

31. The electropurification method of claim 21 wherein the aqueous electrolyte solution introduced into the electrolysis cell is contaminated with metal ions.

32. The electropurification method of claim 31 wherein said metal ions are toxic metals from plating bath effluents, metal stripping baths, biocide formulations and paints, said metals sequestered by a complexing agent, surfactant or reducing agent.

33. The electropurification method of claim 32 wherein the complexing agent, surfactant or reducing agent is modified in the electrolysis cell to release the metal ions for further treatment in the electrolysis cell or for transfer to a metal recovery cell.

34. The method of claim 21 wherein the electrolysis cell includes means positioned in proximity to said electrodes for aiding in managing flow, circulation or residency time of electrolyte, or for shielding and/or guarding the electrolyzer zone.

35. The method of claim 34 wherein the means positioned in proximity to said electrodes for aiding in managing flow, circulation or residency time of electrolyte, or for shielding and/or guarding the electrolyzer zone is a member selected from the group consisting of baffles, inserts, barriers, open tank, partitions and cages.

36. A method for electrochemical synthesis of chemicals, which comprises the steps of:
(i) providing an electrolysis cell which comprises at least one anode and at least one cathode as electrodes positioned in an electrolyzer zone, conduit means for introducing an electrolyte to said electrodes for electrolysis, said electrolysis cell having an open configuration, and excluding a cell housing intended for retaining an electrolyte solution in said electrolyzer zone;
(ii) introducing into the electrolysis cell of (i) an electrolyte comprising an electroactive substrate, and
(iii) imposing a voltage across the electrodes of said electrolysis cell to electrolyze the electrolyte to form a useful product.

37. The method for electrosynthesis of chemicals according to claim 36 wherein said electrolyte comprises an aqueous solution of a salt or an acid.

38. The method for electrosynthesis of chemicals according to claim 36 wherein the useful product is an inorganic or organic compound.

39. The method for electrosynthesis of chemicals according to claim 36 wherein the electrolysis cell of (i) is equipped with a porous diaphragm or permselective membrane.

40. The method of claim 31 wherein the electrolysis cell includes means positioned in proximity to said electrodes for aiding in managing flow, circulation or residency time of electrolyte, or for shielding and/or guarding the electrolyzer zone.

41. The method of claim 40 wherein the means positioned in proximity to said electrodes for aiding in managing flow, circulation or residency time of electrolyte, or for shielding and/or guarding the electrolyzer zone is a member selected from the group consisting of baffles, inserts, barriers, open tank, partitions and cages.

42. A method for electropurification of a contaminated solution, which comprises the steps of:
(i) providing an electrolysis cell comprising at least one anode and at least one cathode as electrodes positioned in an electrolyzer zone, conduit means for introducing an electrolyte to said electrodes for electrolysis, said electrolysis cell having an open configuration, and excluding a cell housing intended for retaining an electrolyte solution in said electrolyzer zone;
(ii) introducing into the electrolysis cell of (i) a contaminated electrolyte solution, and
(iii) imposing a voltage across the electrodes of said electrolysis cell to electrolyze the contaminated electrolyte solution to modify the contaminants therein.

* * * * *